US007519465B2

(12) United States Patent
Bartolomeo et al.

(10) Patent No.: US 7,519,465 B2
(45) Date of Patent: Apr. 14, 2009

(54) VALVETRAIN DRIVE STRETCH COMPENSATION FOR CAMSHAFT TO CRANKSHAFT CORRELATION

(75) Inventors: Antonio E. Bartolomeo, Warren, MI (US); Richard M. Frank, Beverly Hills, MI (US); Ronald J. Kubani, Highland, MI (US); Jordan R. Lee, Lake Orion, MI (US); Anthony L. Marks, Novi, MI (US); Blake B. Nye, Sterling Heights, MI (US); John F. Van Gilder, Webberville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/940,693

(22) Filed: Nov. 15, 2007

(65) Prior Publication Data

US 2009/0030586 A1 Jan. 29, 2009

Related U.S. Application Data

(60) Provisional application No. 60/962,045, filed on Jul. 26, 2007.

(51) Int. Cl.
*G01P 3/481* (2006.01)
*G06F 19/00* (2006.01)

(52) U.S. Cl. .................................... 701/102; 123/90.31

(58) Field of Classification Search ................. 701/102, 701/101, 115; 123/90.16, 90.17, 90.31; 73/114.25
See application file for complete search history.

(56) References Cited

U.S. PATENT DOCUMENTS

| | | | | |
|---|---|---|---|---|
| 6,302,085 | B1 * | 10/2001 | Sekine et al. | 123/90.16 |
| 6,494,086 | B1 * | 12/2002 | Ponti | 73/114.25 |
| 7,389,177 | B2 * | 6/2008 | Grimes et al. | 701/115 |
| 2008/0245142 | A1 * | 10/2008 | Bowling et al. | 73/114.26 |

* cited by examiner

*Primary Examiner*—Hieu T Vo

(57) ABSTRACT

A method of correlating a rotational position of a crankshaft to a rotational position of a camshaft includes determining a stretch value of a timing connection, which drivingly couples the crankshaft and the camshaft, and calculating a crankshaft to camshaft rotational position value indicative of the rotational position of the crankshaft with respect to the rotational position of the camshaft. The crankshaft to camshaft rotational position value is compensated based on the stretch value to provide a compensated crankshaft to camshaft rotational position value and whether the rotational position of the crankshaft correlates to the rotational position of the camshaft is determined based on the compensated crankshaft to camshaft rotational position value.

17 Claims, 3 Drawing Sheets

VALVETRAIN DRIVE STRETCH COMPENSATION FOR CAMSHAFT TO CRANKSHAFT CORRELATION

CROSS-REFERENCE TO RELATED APPLICATIONS

This application claims the benefit of U.S. Provisional Application No. 60/962,045, filed on Jul. 26, 2007. The disclosure of the above application is incorporated herein by reference in its entirety.

FIELD

The present disclosure relates to internal combustion engines, and more particularly to compensating for valvetrain stretch for camshaft to crankshaft correlation.

BACKGROUND

The statements in this section merely provide background information related to the present disclosure and may not constitute prior art.

Internal combustion engines induce combustion of an air and fuel mixture to reciprocally drive pistons within cylinders. The pistons rotatably drive a crankshaft, which transfers drive torque to a driveline. Air is drawn into an intake manifold of the engine and is distributed to the cylinders. More specifically, the air, and in some engines the air and fuel mixture, enters the cylinder through one or more intake ports, which are each selectively opened via actuation of a corresponding intake valve. After combustion, the combustion gases are exhausted from the cylinder through one or more exhaust ports, each of which are selectively opened via actuation of a corresponding exhaust valve.

The movement of the intake and exhaust valves, and thus the opening and closing of the intake and exhaust ports, is regulated by intake and exhaust camshafts. As the camshafts rotate, cam lobes of the respective camshafts induce movement of the respective valves. The camshafts are rotatably driven by the crankshaft via a timing sprocket and timing chain. The timing chain is driven by timing sprockets associated with the crankshaft and the camshafts to enable the crankshaft to drive the camshafts.

The movements of the valves are timed to provide opening and closing of the ports at the proper times during the piston strokes. This timing is provided in terms of the rotational position of each of the intake and exhaust camshafts with respect to each other and with respect to the rotational position of the crankshaft. The rotational position of the crankshaft corresponds to the linear position of the pistons within their respective cylinders (e.g., bottom-dead-center (BDC), top-dead-center (TDC)).

The rotational position of each of the camshafts with respect to the crankshaft performs an influential role in the combustion process. For example, the timing of the opening of the intake port with respect to the piston position influences the amount of air that is drawn into the cylinder during the expansion stroke of the piston. Similarly, the timing of the opening of the exhaust port with respect to the piston position influences the amount of combustion product gas that is exhausted from the cylinder.

Accordingly, engine systems include sensors that monitor the rotational positions of each of the camshafts and the crankshaft. More specifically, a target wheel including a known number of teeth is fixed for rotation with each of the respective camshafts and crankshaft. An associated sensor detects the rising and falling edges of the teeth as they pass the sensor and the sensor generates a pulse-train based thereon. Each target wheel includes a gap (e.g., one or two teeth missing) and/or a wider or thinner tooth, each of which operates as a reference point to determine the rotational position of the respective camshafts and crankshaft.

Because the crankshaft drives the camshafts via the timing sprockets and chain, and because the timing of the intake and exhaust valve movement influences the combustion process, engine systems traditionally monitor the relative rotational positions of the crankshaft position and the camshafts. This is achieved by monitoring the relative positions of the crankshaft pulse-train and the camshaft pulse-trains generated by the respective sensors. If the relative position of the crankshaft to the camshafts deviates by a certain degree, a diagnostic trouble code (DTC) is set indicating a fault with the timing (i.e., relative positions) of the camshafts relative to the crankshaft.

Traditional camshaft to crankshaft timing diagnostics are not as robust as desired. More specifically, traditional diagnostics aren't as accurate as desired and can produce false faults (e.g., setting a DTC when no actual fault exists), or, in some cases, can fail to detect a fault (e.g., fail to set a DTC when a fault exists).

SUMMARY

Accordingly, the present disclosure provides a method of correlating a rotational position of a crankshaft to a rotational position of a camshaft. The method includes determining a stretch value of a timing connection, which drivingly couples the crankshaft and the camshaft, and calculating a crankshaft to camshaft rotational position value indicative of the rotational position of the crankshaft with respect to the rotational position of the camshaft. The crankshaft to camshaft rotational position value is compensated based on the stretch value to provide a compensated crankshaft to camshaft rotational position value and whether the rotational position of the crankshaft correlates to the rotational position of the camshaft is determined based on the compensated crankshaft to camshaft rotational position value.

In one feature, the compensated crankshaft to camshaft rotational position value is compared to a threshold value. The rotational position of the crankshaft does not correlate to the rotational position of the camshaft when the compensated crankshaft to camshaft rotational position value is greater than the threshold value.

In another feature, the method further includes monitoring respective rotational positions of the camshaft and another camshaft. The stretch value is determined based on the respective rotational positions of the camshaft and the other camshaft.

In another feature, correlation between the rotational positions of the camshafts may be evaluated relative to a threshold before selectively performing the calculation of the stretch value.

In another feature, the method further includes comparing the stretch value to a threshold value and indicating that the timing connection is excessively stretched when the stretch value exceeds the threshold value.

In still another feature, the method further includes comparing the stretch value to a threshold value and indicating that the rotational position of the crankshaft does not correlate to the rotational position of the camshaft when the stretch value exceeds the threshold value.

In yet another feature, the method further includes calculating a rotational misalignment value between the crankshaft and the camshaft based on the stretch value. The compensated crankshaft to camshaft rotational position value is determined based on the rotational misalignment value.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 2:
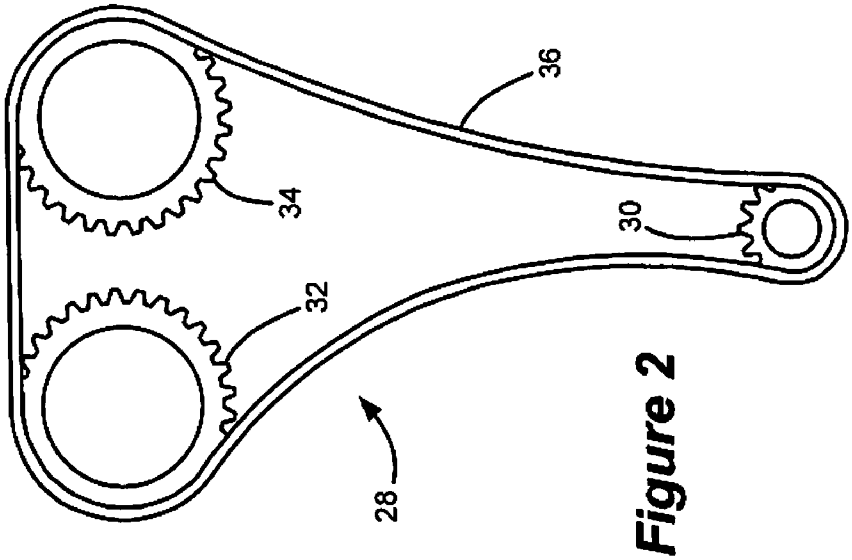
FIG. 2 is a front view of an exemplary timing arrangement of the exemplary engine system of FIG. 1.

The following description is merely exemplary in nature and is in no way intended to limit the disclosure, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Figure 1:
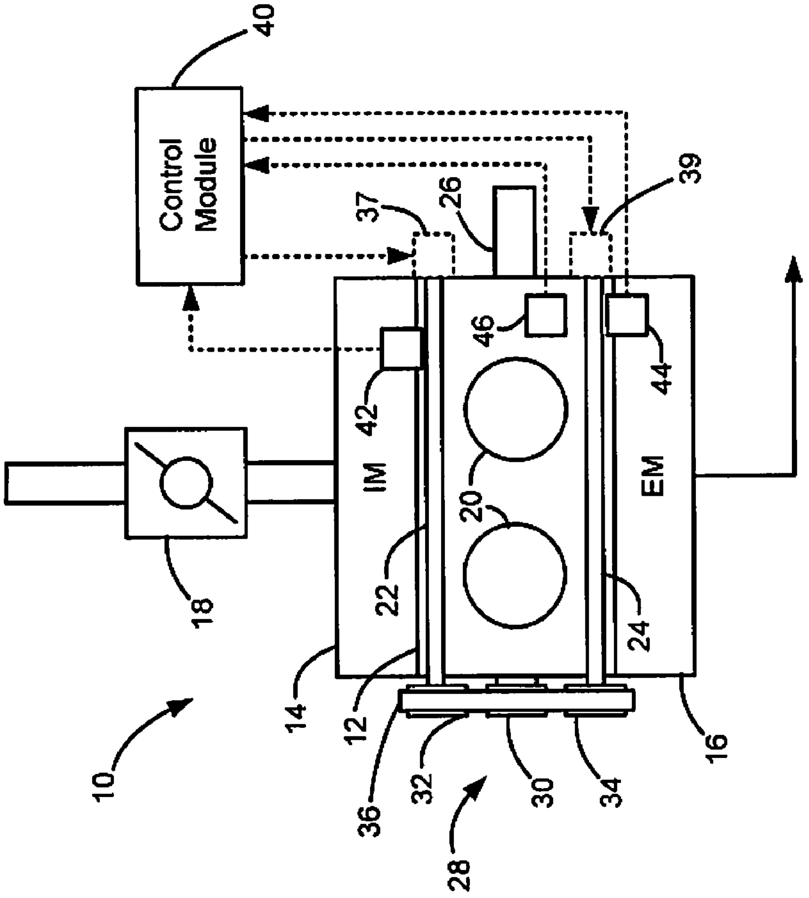
FIG. 1 is a functional block diagram of an exemplary engine system in accordance with the present disclosure.

Referring now to FIG. 1, an exemplary engine system 10 includes an engine 12, an intake manifold 14 and an exhaust manifold 16. The engine 12 combusts an air and fuel mixture to generate drive torque. More specifically, air is drawn into the intake manifold 14 through a throttle 18. Although the exemplary engine system 10 includes a throttle 18, it is anticipated that the teachings of the present disclosure can be implemented in an engine system that does not include a throttle.

The air is mixed with fuel to form a combustion mixture that is compressed by a piston (not shown) within cylinders 20. Although only two cylinders 20 are shown, it is appreciated that the teachings of the present disclosure can be implemented in engine systems having one or more cylinders 20. The air, and in some cases the combustion mixture, travels into the cylinder 20 through an intake port (not shown), which is selectively opened by an intake valve (not shown). Combustion of the combustion mixture is induced within the cylinder 20 (e.g., via a spark from a spark plug or the heat of compression). After the combustion event, the product gases are exhaust from the cylinder 20 through an exhaust port (not shown), which is selectively opened by an exhaust valve (not shown). It is anticipated that the engine system 10 can include one or more intake ports and/or exhaust ports with respective intake and exhaust valves.

With particular reference to FIGS. 1 and 2, the movement of the intake and exhaust valves is induced by respective intake and exhaust camshafts 22, 24, which are rotatably driven by the crankshaft 26 via a timing arrangement 28. More specifically, the crankshaft 26 includes a timing sprocket 30 and the intake and exhaust camshafts include respective timing sprockets 32, 34. A timing connection 36 drivingly interconnects the timing sprockets 30, 32, 34. For example only, the timing connection 36 may include a timing chain. As can be appreciated, timing gears, a pulley and timing belt, and/or other drive mechanisms may also be used.

The crankshaft 26 rotatably drives the intake and exhaust camshafts 22, 24 to open and close the intake and exhaust ports via the corresponding valves in accordance with a desired engine event timing. More specifically, the opening and closing of the intake and exhaust ports are timed with respect to the linear position of the piston within the cylinder 20 and the particular piston stroke.

For example only, the intake port is opened as the piston leaves the top-dead-center (TDC) position at the beginning of the expansion stroke and travels towards the bottom-dead-center (BDC) position. The linear position of the piston within the cylinder 20 corresponds to a rotational position of the crankshaft 26. Therefore, the rotational positions of the intake and exhaust camshafts 22, 24 correspond to the rotational position of the crankshaft. In order to ensure proper operation of the engine system 10, the relative rotational position of the intake and exhaust camshafts 22, 24 with respect to the crankshaft position correspond to a desired relative rotational position. In this manner, the timing of the intake and exhaust events accurately correspond to the position of the piston within the cylinder 20.

It is also anticipated that the engine system 10 can include intake and exhaust cam phasers 37, 39, shown in phantom. The cam phasers 37, 39 adjust the angular position of the intake and exhaust camshafts 22, 24 relative to the angular position of the crankshaft 26. In this manner, the opening and closing events of the intake and exhaust valves can be independently adjusted to achieve a desired engine operation.

A control module 40 monitors the rotation of the intake and exhaust camshafts 22, 24 as well as of the crankshaft 26. Sensors 42, 44 respectively monitor the rotational positions of each of the intake and exhaust camshafts 22, 24. A sensor 46 monitors the rotational position of the crankshaft 26.

More specifically, respective target wheels (not shown), each of which includes a known number of teeth, are fixed for rotation with each of the respective intake and exhaust camshafts 22, 24 and crankshaft 26. Each sensor 42, 44, 46 detects the rising and falling edges of the teeth of its respective target wheel as they pass the sensor 42, 44, 46 and the sensor 42, 44, 46 generates a pulse-train based thereon. The pulse-trains are provided as signals to the control module 40. Each target wheel may include a gap (e.g., one or two teeth missing) and/or a wider/thinner tooth, each of which operates as a reference point to determine the rotational position of the respective intake and exhaust camshafts 22, 24 and of the crankshaft 26.

By comparing the pulse-trains corresponding to the intake and exhaust camshafts 22, 24 to that of the crankshaft 26, the control module 40 can determine whether the relative position between the crankshaft 26 and the respective intake and exhaust camshafts 22, 24 corresponds to a desired relative position. If not, the timing of the intake and exhaust events does not correspond to a desired timing and a diagnostic trouble code (DTC) is set.

In some instances, the relative rotational positions between the intake and exhaust camshafts 22, 24 and the crankshaft 26 come out of proper alignment or correlation. For example, during engine operation, the timing connection 36 can slip or jump, as explained in further detail below. As another example, the timing connection 36 can be improperly assembled onto the timing sprockets 30, 32, 34 during original engine assembly and/or subsequent engine maintenance, resulting in an incorrect relative position between the crankshaft 26 and the camshafts 22, 24 for the desired engine timing.

Furthermore, the timing connection 26 tends to stretch over the lifetime of the engine system 10, which can compound the problem of determining whether the crankshaft 26 and camshafts 22, 24 are properly aligned with respect to one another. As other examples, part to part variations and temperature effects can also play a role in improper alignment.

The valvetrain stretch compensation control of the present disclosure determines a stretch value ($I_{stretch}$ and/or $I_{stretch\,\%}$) in the timing connection and compensates for $I_{stretch}$ and/or $I_{stretch\%}$ when determining whether the rotational positions of the individual camshafts properly correspond to that of the crankshaft. More specifically, the valvetrain stretch compensation control enables $I_{stretch}$ and/or $I_{stretch\%}$ to be considered when executing a camshaft to crankshaft correlation diagnostic, which determines whether the actual camshaft and crankshaft positions correspond to the desired camshaft and crankshaft positions. The following discussion will be described in the context of $I_{stretch\%}$, however skilled artisans will appreciate that the disclosure can be readily adapted to $I_{stretch}$ as well.

The valvetrain stretch compensation control monitors the crankshaft sensor signals to determine whether the camshaft positions correspond to relative desired camshaft positions. More specifically, the camshaft sensor signals are processed to provide respective camshaft rotational positions $\alpha_{CAM1}$ and $\alpha_{CAM2}$, which may be measured in degrees. The difference between $\alpha_{CAM1}$ and $\alpha_{CAM2}$ is determined and is provided as $\Delta\alpha$. $I_{stretch}$ is subsequently determined based on $\Delta\alpha$. $I_{stretch}$ can be determined based on the following exemplary relationship:

$$I_{stretch} = \frac{2\Delta\alpha r_{target}\pi}{360}$$

where $I_{stretch}$ is the drive change between cam sprockets due to stretch. For example, in a chain drive system this is the chain length increase due to stretch (typically measured in millimeters). $r_{target}$ is the effective radius of the camshaft sensor target wheel.

In the case that the timing connection is a chain, for example, $r_{target}$ is provided as the radius of the target wheel at the bottom of the tooth plus the radius of the chain links. To convert $I_{stretch}$ to a percentage:

$$I_{stretch\%} = \frac{I_{stretch} \times 100}{L_{N\_Cam\_Cam}}$$

where $L_{N\_Cam\_Cam}$ is the nominal drive length between the camshafts without stretch.

The valvetrain stretch compensation control compares $I_{stretch\%}$ to first and second thresholds $I_{THR1}$ and $I_{THR2}$, respectively. $I_{THR1}$ corresponds to the camshaft positions being so out of alignment with one another that the timing connection must have been improperly assembled or the timing connection slipped during operation of the engine (i.e., in this case, $I_{stretch\%}$ is so great that it is not indicative of an actual stretch of the timing connection). If $I_{stretch\%}$ is greater than $I_{THR1}$, a so-called tooth-off DTC is set, which indicates that the alignment of the valvetrain is off by at least one tooth of the timing sprockets. $I_{THR2}$ corresponds to an excessively stretched timing connection. If $I_{stretch\%}$ is greater than $I_{THR2}$, an excessive stretch DTC is set. If $I_{stretch\%}$ is not greater than either $I_{THR1}$ or $I_{THR2}$, the timing connection is not sufficiently stretched to affect the camshaft to camshaft correlation, but is used when determining whether each of the camshaft positions correspond to the crankshaft position, as explained in further detail below.

If neither the tooth-off DTC nor the excessive stretch DTC is set during the camshaft to camshaft correlation, the valvetrain stretch compensation control determines a compensator ($\alpha_{stretch}$) based on $I_{stretch\%}$. $\alpha_{stretch}$ indicates that amount of rotational misalignment between the crankshaft and each of the camshafts due to the stretch of the timing connection. $\alpha_{stretch}$ can be determined based on the following exemplary relationship:

$$\alpha_{stretch} = \frac{180 \times I_{stretch\%} \times L_{N\_Cam\_Crank}}{100 \times r_{target} \times \pi}$$

where $\alpha_{stretch}$ is camshaft rotation (typically in degrees) with respect to crankshaft due to valvetrain stretch, $L_{N\_Cam\_Crank}$ corresponds to the nominal drive length between the camshaft to the crankshaft without stretch, and $\alpha_{stretch}$ is calculated for each camshaft.

In order to determine whether each of the camshaft positions correspond to the crankshaft position, the camshaft sensor signals and the crankshaft sensor signal are monitored. The camshaft sensor signals are processed to provide the respective camshaft rotational positions $\alpha_{CAM1}$ and $\alpha_{CAM2}$. Similarly, the crankshaft sensor signal is processed to provide the crankshaft rotational position $\alpha_{CRANK}$. $\alpha_{CRANK}$ is compared to each of $\alpha_{CAM1}$ and $\alpha_{CAM2}$ to provide $\Delta\alpha_1$ and $\Delta\alpha_2$. $\Delta\alpha_1$ and $\Delta\alpha_2$ are indicative of the rotational position of each camshaft with respect to the crankshaft. $\Delta\alpha_1$ and $\Delta\alpha_2$ are adjusted based on $\alpha_{stretch}$ to provide $\Delta\alpha_{COMP1}$ and $\Delta\alpha_{COMP2}$. Thus, $\Delta\alpha_{COMP1}$ and $\Delta\alpha_{COMP2}$ compensate for $I_{stretch\%}$ as follows: $\Delta\alpha_{COMP1}=\Delta\alpha_1-\alpha_{stretch1}$ and $\Delta\alpha_{COMP2}=\Delta\alpha_2-\alpha_{stretch2}$.

$\Delta\alpha_{COMP1}$ and $\Delta\alpha_{COMP2}$ are compared to a threshold ($\Delta\alpha_{THR}$) to determine whether each camshaft is out of alignment with the crankshaft. More specifically, if either $\Delta\alpha_{COMP1}$ and $\Delta\alpha_{COMP2}$ is greater than $\Delta\alpha_{THR}$, the tooth-off DTC is set, which indicates that the alignment of the valvetrain is off by at least one tooth of the timing sprockets. If neither $\Delta\alpha_{COMP1}$ nor $\Delta\alpha_{COMP2}$ is greater than $\Delta\alpha_{THR}$, the valvetrain is properly aligned. In this manner, the valvetrain stretch compensation control compensates the camshaft to crankshaft correlation for stretch in the timing connection, thereby improving the accuracy of the correlation and minimizing false setting of DTCs.

It is anticipated that the valvetrain stretch compensation control can be implemented with engines having any number of timing connections and/or camshafts. For example, the valvetrain stretch compensation control can be implemented with an engine having a single timing connection that drivingly couples the crankshaft with two or more camshafts. Similarly, the valvetrain stretch compensation control can be implemented with an engine having two or more timing connections, each of which drivingly couples the crankshaft with two or more camshafts.

Figure 3:
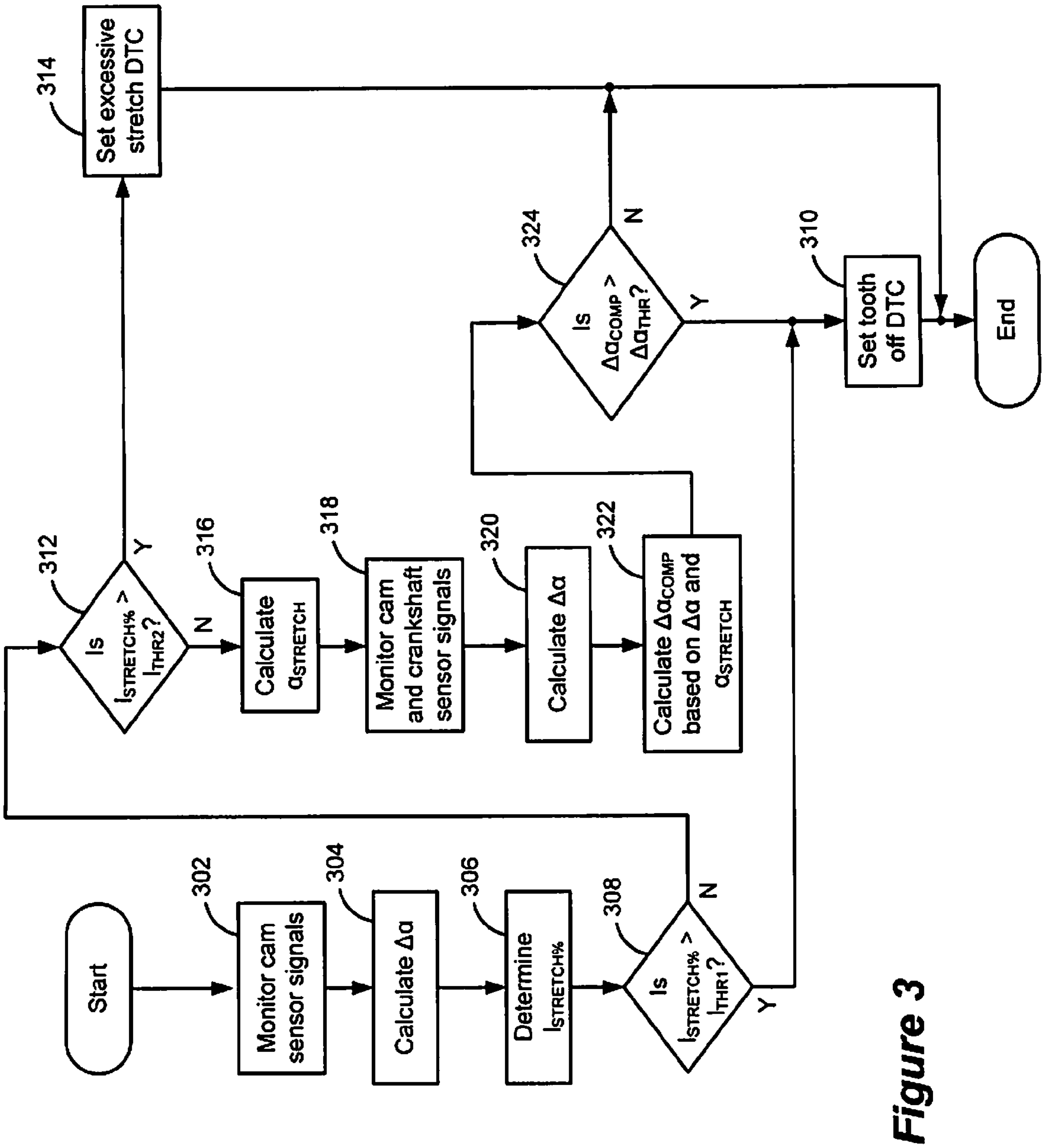
FIG. 3 is flowchart illustrating exemplary steps executed by the valvetrain stretch compensation control of the present disclosure.

Referring now to FIG. 3, exemplary steps that are executed by the valvetrain stretch control will be described in detail. Step 302 begins control of the cam sensor signals. In step 304, control calculates $\Delta\alpha$ based on the cam sensor signals. As discussed above, any offset between the camshaft positions is considered when determining $\Delta\alpha$. Control determines $I_{stretch\%}$ based on $\Delta\alpha$ in step 306.

In step 308, control determines whether $I_{stretch\%}$ is greater than $I_{THR1}$. If $I_{stretch\%}$ is greater than $I_{THR1}$, control sets the tooth-off (TO) DTC in step 310 and control ends. If $I_{stretch\%}$ is not greater than $I_{THR1}$, control determines whether $I_{stretch\%}$ is greater than $I_{THR2}$ in step 312. If $I_{stretch\%}$ is greater than $I_{THR2}$, control sets the excessive stretch DTC in step 314 and control ends. If $I_{stretch\%}$ is not greater than $I_{THR2}$, control calculates $\alpha_{stretch}$ in step 316.

Control monitors the camshaft and crankshaft sensor signals in steps 318. In step 320, control calculates $\Delta\alpha$ (e.g., $\Delta\alpha_1$, $\Delta\alpha_2$) for each of the camshafts relative to the crankshaft based on the camshaft sensor signals and the crankshaft sensor signals. In step 322, control calculates $\Delta\alpha_{COMP}$ (e.g., $\Delta\alpha_{COMP1}$, $\Delta\alpha_{COMP2}$) for each of the camshafts relative to the crankshaft based on the $\Delta\alpha$ values and $\alpha_{stretch}$. Control determines whether each of the $\Delta\alpha_{COMP}$ values, which correspond to each of the camshafts relative to the crankshaft, is greater than $\Delta\alpha_{THR}$ in step 324. If $\Delta\alpha_{COMP}$ is greater than $\Delta\alpha_{THR}$, control continues in step 310 and control ends. If $\Delta\alpha_{COMP}$ is not greater than $\Delta\alpha_{THR}$, control ends.

Figure 4:
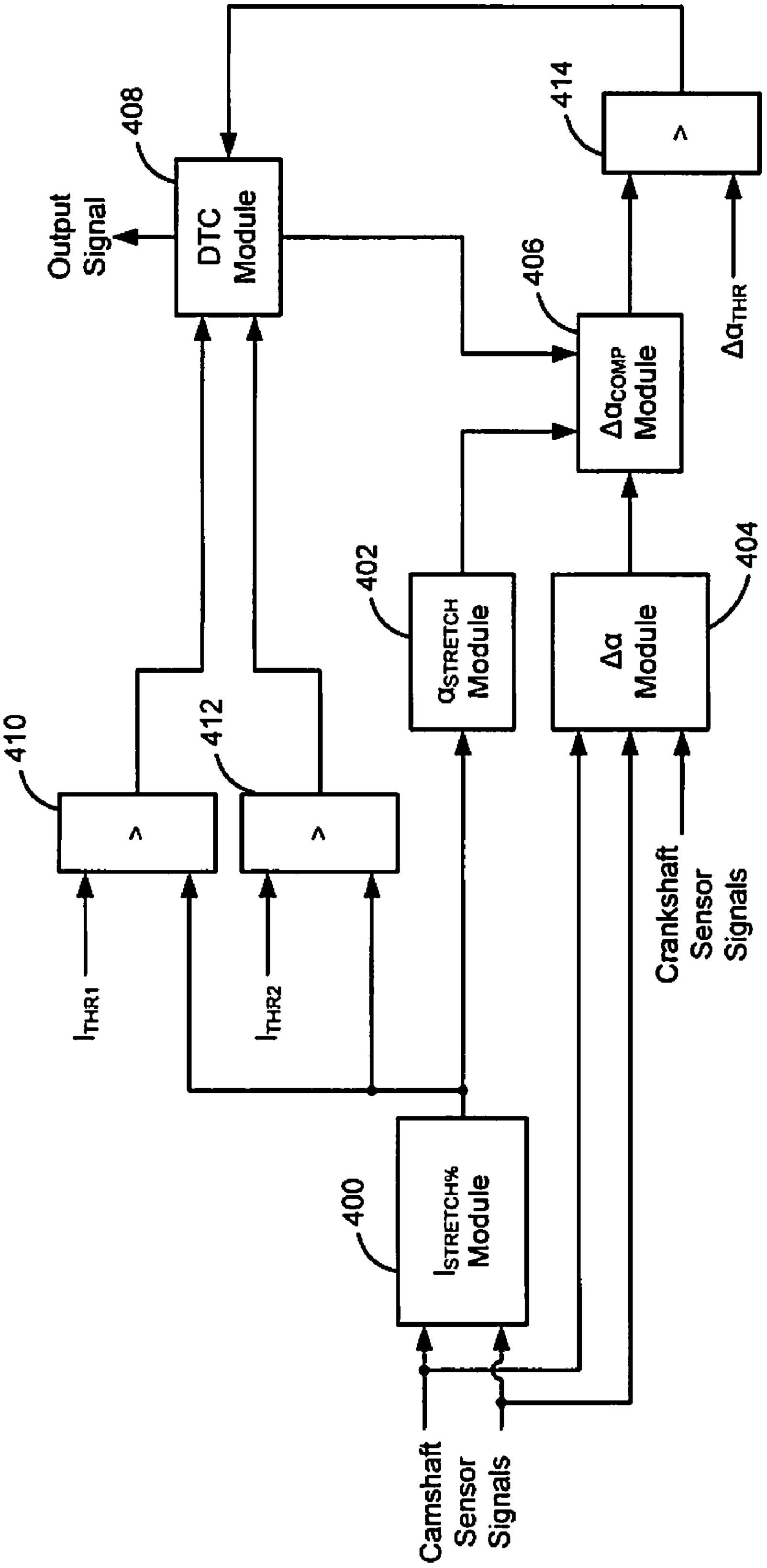
FIG. 4 is a functional block diagram of exemplary modules that execute the valvetrain stretch compensation control.

Referring now to FIG. 4, exemplary modules that execute the valvetrain compensation control will be discussed in detail. The exemplary modules include an $I_{stretch\%}$ module 400, an $\alpha_{stretch}$ module 402, a $\Delta\alpha$ module 404, a $\Delta\alpha_{COMP}$ module 406, a DTC module 408 and comparator modules 410, 412 and 414, respectively. The $I_{stretch\%}$ module 400 determines $I_{stretch\%}$ based on the camshaft sensor signals. $I_{stretch\%}$ is output to the $\alpha_{stretch}$ module 402 and the comparator modules 410, 412.

The comparator module 410 compares $I_{stretch\%}$ to $I_{THR1}$ and outputs a signal to the DTC module 408 based thereon. For example, if $I_{stretch\%}$ is greater than $I_{THR1}$, the comparator module 410 outputs a "1" to the DTC module 408. If $I_{stretch\%}$ is not greater than ITHRI, the comparator module 410 outputs a "0" to the DTC module 408. Similarly, the comparator module 410 compares $I_{stretch\%}$ to $I_{THR2}$ and outputs a signal to the DTC module 408 based thereon. The DTC module 408 selectively sets a DTC based on the signals from the comparators 410, 412.

The $\alpha_{stretch}$ module 402 determines $\alpha_{stretch}$ based on $I_{stretch\%}$. The $\Delta\alpha$ module 404 determines $\Delta\alpha$ for each of the camshafts with respect to the crankshaft based on the camshaft sensor signals and the crankshaft sensor signal. The $\Delta\alpha_{COMP}$ module 406 determines $\Delta\alpha_{COMP}$ for each of the camshafts with respect to the crankshaft based on $\alpha_{stretch}$ and the $\Delta\alpha$ values output from the $\Delta\alpha$ module 404. The comparator module 414 compares $\Delta\alpha_{COMP}$ to $\Delta\alpha_{THR}$ and outputs a signal to the DTC module 408 based thereon. For example, if $\Delta\alpha_{COMP}$ is greater than $\Delta\alpha_{THR}$, the comparator module 410 outputs a "1" to the DTC module 408. If $\Delta\alpha_{COMP}$ is not greater than $\Delta\alpha_{THR}$, the comparator module 410 outputs a "0" to the DTC module 408.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method of correlating a rotational position of a crankshaft to a rotational position of a camshaft, comprising:

determining a stretch value of a timing connection, which drivingly couples the crankshaft and the camshaft;

calculating a crankshaft to camshaft rotational position value indicative of the rotational position of the crankshaft with respect to the rotational position of the camshaft;

compensating said crankshaft to camshaft rotational position value based on said stretch value to provide a compensated crankshaft to camshaft rotational position value; and determining whether the rotational position of the crankshaft correlates to the rotational position of the camshaft based on said compensated crankshaft to camshaft rotational position value.

2. The method of claim 1 further comprising comparing said compensated crankshaft to camshaft rotational position value to a threshold value, wherein the rotational position of the crankshaft does not correlate to the rotational position of the camshaft when said compensated crankshaft to camshaft rotational position value is greater than said threshold value.

3. The method of claim 1 further comprising monitoring respective rotational positions of the camshaft and another camshaft, wherein said stretch value is determined based on said respective rotational positions of the camshaft and the other camshaft.

4. The method of claim 1 further comprising:

comparing said stretch value to a threshold value; and indicating that said timing connection is excessively stretched when said stretch value exceeds said threshold value.

5. The method of claim 1 further comprising:

comparing said stretch value to a threshold value; and indicating that the rotational position of the crankshaft does not correlate to the rotational position of the camshaft when said stretch value exceeds said threshold value.

6. The method of claim 1 further comprising calculating a rotational misalignment value between the crankshaft and the camshaft based on the stretch value, wherein said compensated crankshaft to camshaft rotational position value is determined based on said rotational misalignment value.

7. A crankshaft to camshaft correlation system, comprising:

a first module that determines a stretch value of a timing connection, which drivingly couples the crankshaft and the camshaft;

a second module that calculates a crankshaft to camshaft rotational position value indicative of a rotational position of the crankshaft with respect to a rotational position of the camshaft;

a third module that compensates said crankshaft to camshaft rotational position value based on said stretch value to provide a compensated crankshaft to camshaft rotational position value; and a fourth module that determines whether the rotational position of the crankshaft correlates to the rotational position of the camshaft based on said compensated crankshaft to camshaft rotational position value.

8. The crankshaft to camshaft correlation system of claim 7 wherein said fourth module compares said compensated crankshaft to camshaft rotational position value to a threshold value, wherein the rotational position of the crankshaft does not correlate to the rotational position of the camshaft when said compensated crankshaft to camshaft rotational position value is greater than said threshold value.

9. The crankshaft to camshaft correlation system of claim 7 said first module monitors respective rotational positions of the camshaft and another camshaft and determines said stretch value based on said respective rotational positions of the camshaft and the other camshaft.

10. The crankshaft to camshaft correlation system of claim 6 further comprising:

a sixth module that compares said stretch value to a threshold value; and a seventh module that indicates that said timing connection is excessively stretched when said stretch value exceeds said threshold value.

11. The crankshaft to camshaft correlation system of claim 6 further comprising:

a sixth module that compares said stretch value to a threshold value; and a seventh module that indicates that the rotational position of the crankshaft does not correlate to the rotational position of the camshaft when said stretch value exceeds said threshold value.

12. The crankshaft to camshaft correlation system of claim 6 further comprising a sixth module that calculates a rotational misalignment value between the crankshaft and the camshaft based on the stretch value, wherein said compensated crankshaft to camshaft rotational position value is determined based on said rotational misalignment value.

13. A method of correlating a rotational position of a crankshaft to rotational positions of first and second camshafts, comprising:

monitoring respective rotational positions of the first and second camshafts;

determining a stretch value of a timing connection, which drivingly couples the crankshaft and the camshaft, based on said respective rotational positions;

calculating a crankshaft to camshaft rotational position value indicative of the rotational position of the crankshaft with respect to the rotational position of one of the first and second camshafts;

compensating said crankshaft to camshaft rotational position value based on said stretch value to provide a compensated crankshaft to camshaft rotational position value; and determining whether the rotational position of the crankshaft correlates to the rotational position of said one of the first and second camshafts based on said compensated crankshaft to camshaft rotational position value.

14. The method of claim 13 further comprising comparing said compensated crankshaft to camshaft rotational position value to a threshold value, wherein the rotational position of the crankshaft does not correlate to the rotational position of the camshaft when said compensated crankshaft to camshaft rotational position value is greater than said threshold value.

15. The method of claim 13 further comprising:

comparing said stretch value to a threshold value; and indicating that said timing connection is excessively stretched when said stretch value exceeds said threshold value.

16. The method of claim 13 further comprising:

comparing said stretch value to a threshold value; and indicating that the rotational position of the crankshaft does not correlate to the rotational position of the camshaft when said stretch value exceeds said threshold value.

17. The method of claim 13 further comprising calculating a rotational misalignment value between the crankshaft and said one of the first and second camshafts based on the stretch value, wherein said compensated crankshaft to camshaft rotational position value is determined based on said rotational misalignment value.

* * * * *